United States Patent
Guo et al.

(10) Patent No.: US 8,770,926 B2
(45) Date of Patent: Jul. 8, 2014

(54) ROUGH DENSE CERAMIC SEALING SURFACE IN TURBOMACHINES

(75) Inventors: Changsheng Guo, South Windsor, CT (US); Christopher W. Strock, Kennebunk, ME (US); Thomas W. Stowe, Hebron, CT (US); Paul W. Baumann, Amesbury, MA (US)

(73) Assignee: United Technologies Corporation, Hartford, CT (US)

( * ) Notice: Subject to any disclaimer, the term of this patent is extended or adjusted under 35 U.S.C. 154(b) by 684 days.

(21) Appl. No.: 12/910,973

(22) Filed: Oct. 25, 2010

(65) Prior Publication Data

US 2012/0099972 A1  Apr. 26, 2012

(51) Int. Cl.
*F01D 5/20* (2006.01)
*F01D 11/08* (2006.01)
*F04D 29/18* (2006.01)

(52) U.S. Cl.
USPC ................................ 415/173.4; 415/174.4

(58) Field of Classification Search
USPC .................... 415/173.4, 174.4; 416/241 B
See application file for complete search history.

(56) References Cited

U.S. PATENT DOCUMENTS

| | | | |
|---|---|---|---|
| 4,227,703 A | 10/1980 | Stalker et al. | |
| 4,238,170 A | 12/1980 | Robideau et al. | |
| 4,588,607 A | 5/1986 | Matarese et al. | |
| 4,783,341 A | 11/1988 | Packer et al. | |
| 4,861,618 A | 8/1989 | Vine et al. | |
| 4,884,820 A | 12/1989 | Jackson et al. | |
| 4,936,745 A | 6/1990 | Vine et al. | |
| 5,113,582 A | 5/1992 | Monson et al. | |
| 5,286,541 A * | 2/1994 | Darjee et al. | 428/40.9 |
| 5,434,210 A | 7/1995 | Rangaswamy et al. | |
| 5,536,022 A | 7/1996 | Sileo et al. | |
| 5,562,404 A | 10/1996 | Koff et al. | |
| 5,578,095 A * | 11/1996 | Bland et al. | 51/295 |
| 5,645,399 A | 7/1997 | Angus | |
| 5,705,231 A | 1/1998 | Nissley et al. | |
| 5,715,596 A | 2/1998 | Bintz | |
| 5,780,116 A | 7/1998 | Sileo et al. | |
| 5,780,171 A | 7/1998 | Nissley et al. | |
| 5,879,753 A | 3/1999 | Zajchowski et al. | |
| 5,950,308 A | 9/1999 | Koff et al. | |
| 5,952,110 A | 9/1999 | Schell et al. | |
| 6,089,825 A | 7/2000 | Walden et al. | |
| 6,102,656 A * | 8/2000 | Nissley et al. | 415/174.4 |

(Continued)

FOREIGN PATENT DOCUMENTS

EP  0919699 A2  6/1999

OTHER PUBLICATIONS

Article entitled "On the Potential of Metal and Ceramic Based Abradables in Turbine Seal Applications", Proceedings of the Thirty-Sixth Turbomachinery Symposium—2007, Dieter Sporer et al., pp. 79-86.

(Continued)

*Primary Examiner* — Edward Look
*Assistant Examiner* — Christopher J Hargitt
(74) *Attorney, Agent, or Firm* — Kinney & Lange, P.A.

(57) ABSTRACT

An abrasive coating is formed on a rotor shaft that rotates with respect to cantilevered vanes. The coating is formed by thermal spray techniques and comprises a ceramic layer on a metal bond coat. The coating surface is roughened by crush grinding or by grit blasting to increase the abradability of the surface.

19 Claims, 3 Drawing Sheets

(56) References Cited

U.S. PATENT DOCUMENTS

| | | | |
|---|---|---|---|
| 6,177,174 B1 | 1/2001 | Legrand | |
| 6,190,124 B1 * | 2/2001 | Freling et al. | 415/173.4 |
| 6,358,002 B1 | 3/2002 | Good et al. | |
| 6,383,658 B1 | 5/2002 | Carlson et al. | |
| 6,537,021 B2 | 3/2003 | Howard et al. | |
| 6,703,137 B2 | 3/2004 | Subramanian | |
| 6,808,747 B1 * | 10/2004 | Shih et al. | 427/249.5 |
| 7,241,108 B2 * | 7/2007 | Lewis | 415/173.4 |
| 7,407,369 B2 | 8/2008 | Schwarz et al. | |
| 7,510,370 B2 | 3/2009 | Strangman et al. | |
| 8,246,477 B2 * | 8/2012 | Downey et al. | 464/151 |
| 2004/0005452 A1 | 1/2004 | Dorfman et al. | |
| 2006/0140756 A1 | 6/2006 | Schwarz et al. | |
| 2007/0274837 A1 * | 11/2007 | Taylor et al. | 416/241 R |
| 2008/0063520 A1 | 3/2008 | Baumann et al. | |
| 2008/0087023 A1 | 4/2008 | Suciu et al. | |
| 2008/0219835 A1 | 9/2008 | Freling et al. | |
| 2008/0226879 A1 | 9/2008 | Strock et al. | |
| 2009/0017260 A1 | 1/2009 | Kulkarni et al. | |
| 2009/0097970 A1 | 4/2009 | Tholen et al. | |
| 2009/0136740 A1 * | 5/2009 | Reynolds et al. | 428/325 |
| 2010/0098923 A1 | 4/2010 | Freling et al. | |
| 2010/0143103 A1 | 6/2010 | Sellars et al. | |

OTHER PUBLICATIONS

Article entitled "Increased Efficiency of Gas Turbines", New High-Temperature Seal System, Sulzer Technical Review Feb. 2008, Dieter Sporer et al., pp. 1-4.

European Search Report, mailed Jul. 6, 2012.

* cited by examiner

ROUGH DENSE CERAMIC SEALING SURFACE IN TURBOMACHINES

CROSS-REFERENCE TO RELATED APPLICATIONS

This application is related to the following co-pending applications that are filed on even date herewith and are assigned to the same assignee: ABRASIVE ROTOR COATING FOR FORMING A SEAL IN A GAS TURBINE ENGINE, Ser. No. 12/910,989, THERMAL SPRAY COATING PROCESS FOR COMPRESSOR SHAFTS, Ser. No. 10/910,994, FRIABLE CERAMIC ROTOR SHAFT ABRASIVE COATING, Ser. No. 12/910,966, ABRASIVE ROTOR SHAFT CERAMIC COATING, Ser. No. 12/910,960, ABRASIVE CUTTER FORMED BY THERMAL SPRAY AND POST TREATMENT, Ser. No. 12/911,004, LOW DENSITY ABRADABLE COATING WITH FINE POROSITY, Ser. No. 12/910,982, and SELF DRESSING, MILDLY ABRASIVE COATING FOR CLEARANCE CONTROL, Ser. No. 12/910,954. The disclosures of these applications are incorporated herein by reference in their entirety.

BACKGROUND

Gas turbine engines include compressor rotors including a plurality of rotating compressor blades. Minimizing the leakage of air, such as between tips of rotating blades and a casing of the gas turbine engine increases the efficiency of the gas turbine engine as the leakage of air over the tips of the blades can cause aerodynamic efficiency losses. To minimize this, the gap at tips of the blades is set small and at certain conditions, the blade tips may rub against and engage an abradable seal on the casing of the gas turbine. The abradability of the seal material prevents damage to the blades while the seal material itself wears to generate an optimized mating surface and thus reduce the leakage of air.

Abradable seals have also been used in turbines to reduce the gap between a rotor and a vane. Thermally sprayed abradable seals have been used in gas turbine engines since the late 1960s. The seals have been made as coatings from composite materials that derive their abradability from the use of low shear strength materials or from a porous, friable coating.

Rotor seal coatings running against the tips of cantilevered vanes have, nevertheless, room for improvement. The coating should not be too thermally conductive, such as an alumina coating. This could cause thermal expansion induced runaway events. Use of a more insulative coating such as zirconia could spall during deep or high rate rub interactions with the vanes. Both situations can result in having to establish more open clearances between the rotor shaft and the vane tips.

In the past, cantilevered vane rubs are typically limited to less than 2 mils (50.4 microns) and have less than full circumference contact due to the risks of high rub forces, coating spallation or a thermal runaway event where the heat from the rub causes thermal expansion of the rotor. The rotor, when heated sufficiently, can grow out to interfere with the vanes. The result can be a burn through causing holes in the rotating shaft, which can cause subsequent unscheduled engine removal.

A need exists for a coating that can prevent the rotor from being damaged during runaway events while still allowing the vanes to maintain acceptable sealing gap dimensions.

SUMMARY

The present invention comprises a ceramic rotor coating with a deliberately roughened abrasive surface. The coating is adapted to prevent damage to the rotor in the event of a high rub interaction rate event. In case of a high rub interaction, bare vane tips are abraded while rotor dimensions and surface integrity remain unchanged.

DETAILED DESCRIPTION

Figure 1:
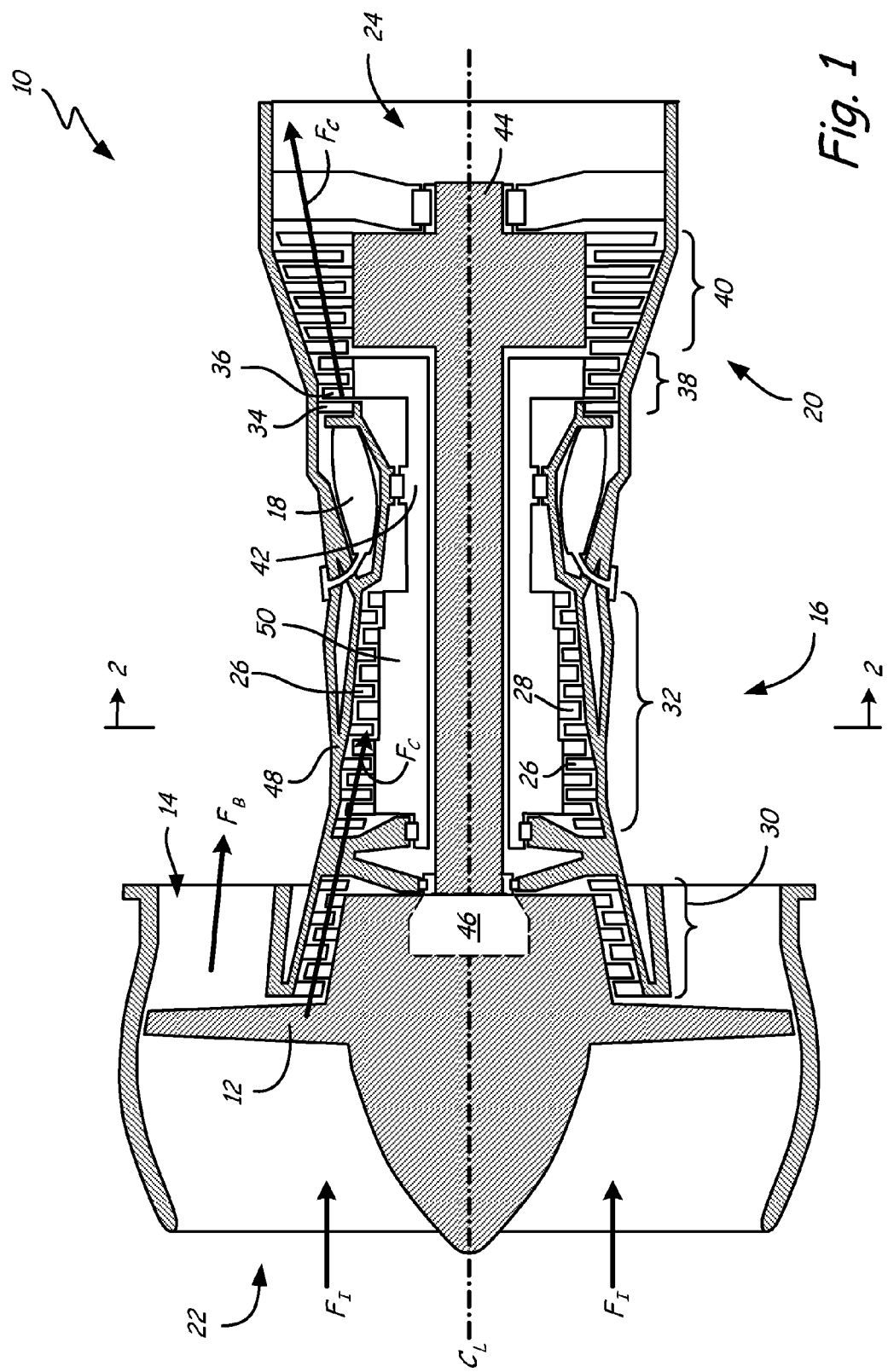
FIG. 1 illustrates a simplified cross-sectional view of a gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (HPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly) to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_1$ enters inlet 22 and divides into core flow $F_C$ and bypass flow $F_B$, downstream of fan 12, core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow $F_C$, and LPC section 30 may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 42, driving HPT section 32 of compressor 16 via HPT shaft 42. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
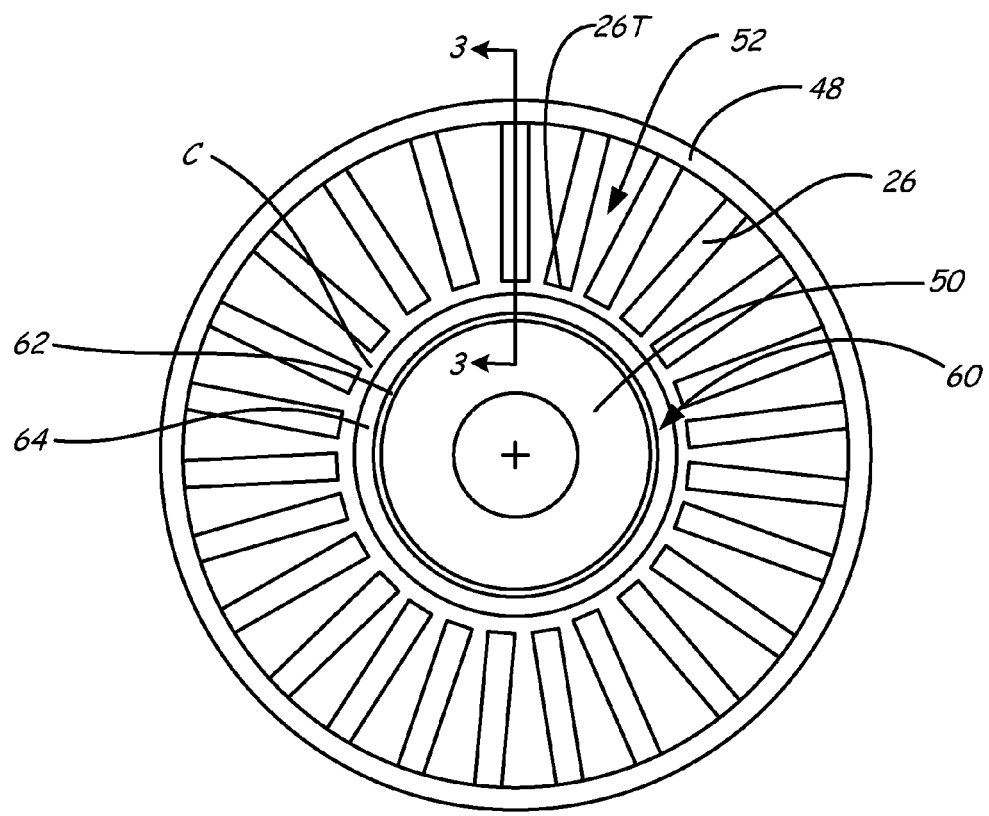
FIG. 2 illustrates a simplified cross sectional view of a rotor shaft inside a casing illustrating the relationship of the rotor and vanes taken along the line 2-2 of FIG. 1, not to scale.
Figure 3:
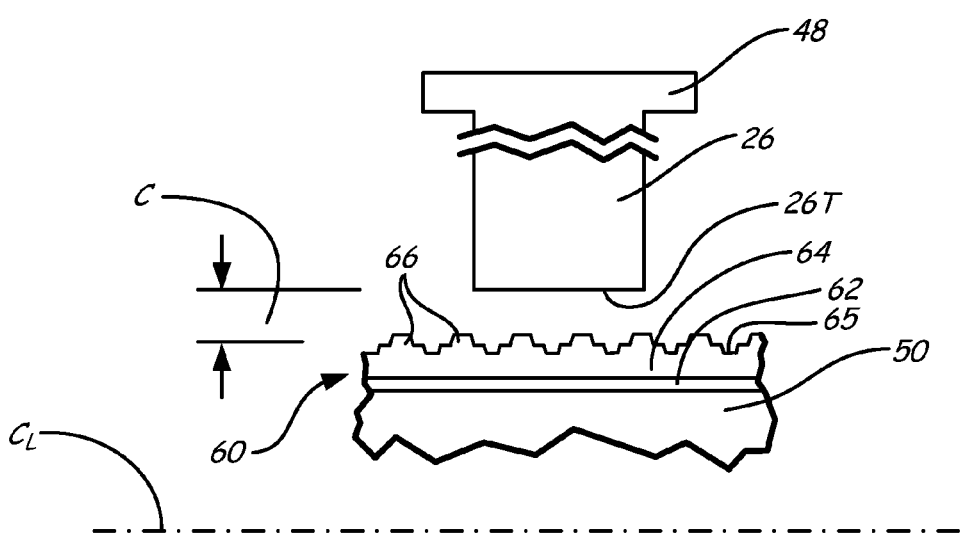
FIG. 3 is a cross sectional view taken along the line 3-3 of FIG. 2, not to scale.

The present invention is intended to be used with stator vanes in turbine engines. FIG. 2 and FIG. 3 below disclose the invention with respect to a stator vane. The coating of this invention may be used with a rotor shaft. The coating is applied by the process described in commonly owned patent application "Thermal Spray Coating Process for Compressor Shafts" and incorporated by reference herein in its entirety.

FIG. 2 is a cross section along line 2-2 of FIG. 1 of a casing 48 which has a rotor shaft 50 inside. Vanes 26 are attached to casing 48 and the gas path 52 is shown as the space between vanes 26. Coating 60, corresponding to the coating of this invention, is on rotor shaft 50 such that the clearance C between coating 60 and the tips 26T of vanes 26 has the proper tolerance for operation of the engine, e.g., to serve as a seal to prevent leakage of air (thus reducing efficiency), while not interfering with relative movement of the vanes and rotor shaft.

FIG. 3 shows the cross section along line 3-3 of FIG. 2, with casing 48 and vane 26. Coating 60 is attached to rotor 50, with a clearance C between coating 60 and vane tip 26T of vane 26 that varies with operating conditions, as described herein.

FIG. 3 shows bi-layer coating 60 in detail. Coating 60 comprises a first metallic bond coat 62 that has been applied to rotor 50. Ceramic coating 64 is placed on top of metallic bond coat 62. Ceramic coating 64 has roughened surface 65 that is the subject of this invention. Roughened surface 65 has asperities 66 that aid in abrading vane surface 26T in clearance C in the event of a physical encounter during engine operation. By acting as an abrading surface, the physical integrity of ceramic layer 64 is maintained at the expense of abradable vain tip 26T, thereby preserving the insulative and other protective properties of ceramic layer 64 on rotor 50.

Bond coat 62 is a nickel aluminum alloy or may be formed of MCrAl or MCrAlY where the metal M can be nickel (Ni), iron (Fe), or cobalt (Co), or combinations thereof, and the alloying elements are chromium (Cr), aluminum (Al), and yttrium (Y). For example, bond coat 62 may be 15-40 wt. % Cr, 6-15 wt. % Al, and 0.6-1.0 wt. % Y and the balance is cobalt, nickel, or iron, and combinations thereof.

Bond coat 62 is thin, up to ten mils (0.25 microns), more specifically ranging from about 3 mils to about 7 mils (about 76 to about 178 microns). In the illustrated embodiment, ceramic coating 62 is about twice as thick, ranging from about 7 mils to about 12 mils (about 178 to about 305 microns).

Roughened ceramic layer 64 may be any of the zirconia based ceramics such as yttria stabilized zirconia and others as are described in commonly owned U.S. Pat. Nos. 4,861,618, 6,102,656, 6,358,002, and 6,190,124 which are incorporated by reference herein in their entirety. A preferred embodiment is a zirconium oxide abrasive coating as described in U.S. Pat. No. 6,190,124 containing 11 to 14 wt. % zirconia with vertical microcracks for mechanical integrity during thermal cycling. Preferably the coating contains 12 wt. % zirconium.

Prior art sealing systems contain an abrading (cutting) surface operating against an abradable surface. Material removed from the abradable surface by the cutter assists in rounding up the surfaces and preventing heating caused by rub interactions between the two surfaces. There are two advantages of using zirconia as an abrading surface. First, vertically microcracked zirconia is extremely hard and can be used against bare superalloy vanes. Since an additional abradable layer in the seal system is not required, repair during engine service is simplified. Secondly, zirconia is a thermal insulator that protects against substrate heating during rub events. Other ceramic coatings such as alumina and cubic boron nitride may also be used.

Figure 4:
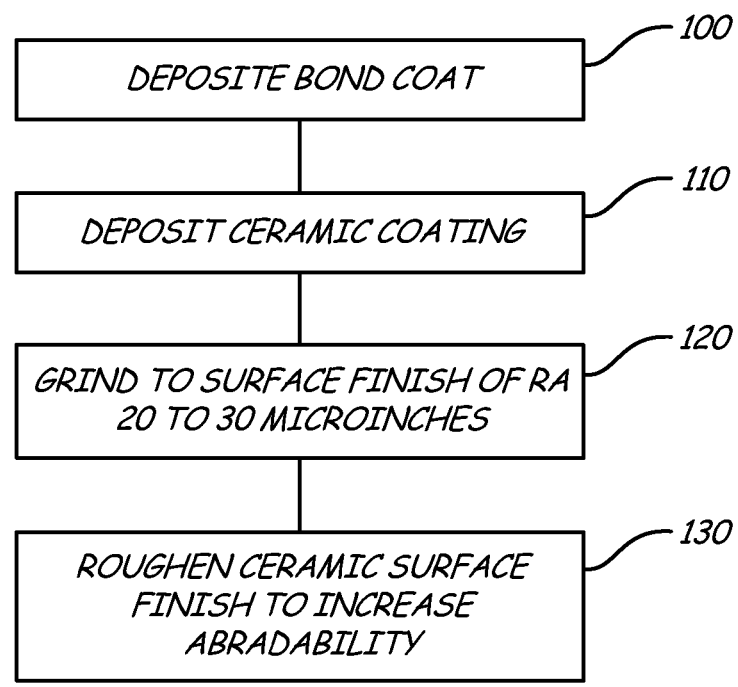
FIG. 4 illustrates a process to prepare a roughened ceramic surface.

The preparation of a ceramic abrading layer is shown in FIG. 4. The first step is to deposit a bond coat (Step 100). The metallic bond coat can be deposited by any method known in the art for depositing such materials. For example, the bond coat may be deposited by low pressure plasma spray (LPPS), air plasma spray (APS), electron beam physical vapor deposition (EBPVD), electroplating, cathodic arc or any other method. A preferred embodiment is air plasma spray. The thickness of the bond coat is 0 to 15 mils (381 microns).

The next step is to deposit the ceramic coating (Step 110). The ceramic coating may be deposited by any method known in the art such as LPPS, APS, EBPVD, high velocity oxygen fuel (HVOF) or others known in the art. For zirconia based coatings, thermal spray methods such as air plasma spray or HVOF are preferred to form dense coatings with vertical microcracks. The thickness of the zirconia coating is 3 mils to 25 mils (176 microns to 635 microns). Preferably the thickness of the zirconia coating is 19 mils to 21 mils (483 microns to 533 microns).

Following deposition, the coated surfaces are ground to a surface finish of about 20 Ra to 30 Ra in microinches (0.51 Ra to 0.76 Ra in microns). (Step 120) In this condition, the smoothness of the ceramic surface is insufficient to remove metal from a blade or vane tip during a high rub interaction event and localized heating, spalling, or other damage is possible.

The invention is defined in Step 130 in which the ground ceramic wear surface is roughened to increase abradability such that upon contact the bare vane surfaces will abrade in deference to the roughened ceramic surface. Two embodiments that may be used to roughen the ceramic seal surface are crush grinding and grit blasting. In both cases, the rough surface is produced by locally fracturing the surface to remove particles on the order of the splat size of the thermally deposited ceramic surface typically ranging in size from 0.2 to 1.8 mils (5 to 45 microns). Roughness of the surface is 100 to 300 Ra in microinches (2.54 to 7.62 in microns). Preferably a surface roughness of 150 to 250 Ra in microinches (3.81 to 6.35 in microns) is desired.

Crush grinding is a process normally used to dress grinding wheels to reshape and true the surface profile of the wheel. In this process, another grinding wheel is pushed against the wheel to be trued with considerable force. Both wheels are rotating such that their surfaces are moving in the same direction at their point of contact. The crush grinding wheel can be powered or can be free wheeling. The crushing contact causes individual grits of the working wheel to be removed such that the surface is made to conform to the contour of the crush wheel. The crush wheel can be another grinding wheel or a smooth metal wheel.

In the context of this invention, the crush grinding wheel is preferably a brazed, fixed diamond grit wheel of about 60 mesh grit size. In the crush grinding process, the crush wheel and the ground ceramic surface of the part are moving in the same direction at their point of contact with about a 20% surface speed differential. The contact force between the two surfaces is about 100 pounds (45.4 kilograms). The resulting interaction results in the fracture and removal of small pieces of the ceramic coating that are on the order of the size of the cooling splats of the thermally deposited ceramic coating. The resulting surface has increased abradability due to the surface roughness. The crush grinding process has been found to produce a repeatable surface texture with good dimensional control.

Another method to roughen the ground ceramic surface is by grit blasting. In grit blasting, abrasive grit particles are propelled toward the ceramic surface in order to remove pieces from the surface by fracture. Upon impact, the grit particles inject shock waves into the ceramic that result in spallation of ceramic particles on the order of the size of the cooling splats in the thermally deposited coating. In this embodiment, 60 mesh aluminum oxide grit is used with a 0.375 inch (1 centimeter) nozzle running at a 60 psi (0.41 MPa) air pressure. For grit blasting, the part is placed on a turntable of an automated grit blast machine with the nozzle aimed perpendicular to the part surface. The nozzle traverses axially back and forth over the part at a rate of 5 inches (12.7 centimeters) per minute while the part rotates at 20 rpm. The process is typically finished after four complete passes over the surface.

The present invention successfully provides passive protection against catastrophic thermal runaway events that may cause burn through of the rotor shaft. The invention prevents this by introducing an abrasive surface on a dense thermally insulative coating on a rotor surface that maintains physical integrity in the event of physical contact with vanes. By roughening the ceramic surface, the vane wear mechanism is abrasive metal removal. The wear mechanism with smooth ceramic surfaces is sliding contact adhesive wear and resulting frictional heating and potential failure by burn through.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of conditioning a dense ceramic coating to form an abrasive seal comprising:
    forming a part with a surface;
    depositing a bond coat on the surface;
    depositing a ceramic coating on the bond coat;
    grinding the ceramic surface to a surface finish of 20 to 30 microinches (0.51 microns to 0.76 microns); and
    roughening the ceramic surface to a roughness from about 100 Ra in microinches to about 300 Ra (2540 Ra to 7620 Ra in microns) to form an abrasive seal.

2. The method of claim 1 wherein the bond coat is MCrAlY where M is Ni or Co or alloys thereof.

3. The method of claim 2 wherein the bond coat is deposited by air plasma spraying.

4. The method of claim 1 wherein the ceramic coating is zirconia containing yttria.

5. The method of claim 4 wherein the yttria stabilized zirconia contains 11-14 wt. % yttria.

6. The method of claim 1 wherein the ceramic surface is roughened by crush grinding.

7. The method of claim 1 wherein the ceramic surface is roughened by grit blasting.

8. An abrasive coating for a rotor that moves relative to cantilevered vanes, the coating comprising:
    a metal bond coat layer on the rotor shaft;
    a ceramic layer on the metal bond coat layer providing thermal insulation of the rotor; and
    a roughened surface on the ceramic layer for abrading bare vane tips that contact the rotor during operation with a roughness of from about 100 Ra to about 300 Ra in microinches (2540 Ra to 7620 Ra in microns).

9. The abrasive coating of claim 8 wherein the metal bond layer ranges in thickness between about 3 mils (76 microns) to about 7 mils (178 microns).

10. The abrasive coating of claim 8 wherein the metal bond layer is formed of a nickel aluminum alloy, MCrAl, or MCrAlY wherein M is nickel, iron, cobalt, or alloys thereof.

11. The abrasive coating of claim 10 wherein the metal bond layer is formed of 15-40 wt % Cr, 6-15 wt % Al, 0.6-1.0 wt % Y and the balance nickel, iron, cobalt, or combinations thereof.

12. The abrasive coating of claim 10 wherein the ceramic layer is yttria stabilized zirconia containing 11-14 wt. % yttria.

13. The abrasive coating of claim 12 wherein the ceramic layer is zirconia containing 12 weight percent yttria.

14. The abrasive coating of claim 12 wherein the ceramic layer ranges in thickness between about 3 mils (76 microns) and 25 mils (635 microns).

15. A compressor for a gas turbine engine comprising:
    a rotor having a plurality of blades extending radially outward from the rotor;
    a plurality of cantilevered vanes between the rotor blades and extending radially inward toward the rotor; and
    a coating on the portion of the rotor facing bare vane tips of the vanes, the coating including a metal bond coat layer on the outer surface, a ceramic layer over the bond layer, and an abrasive surface on the ceramic layer with a surface roughness of from about 100 Ra to about 300 Ra in microinches (2540 Ra to 7620 Ra in microns), whereby the ceramic layer provides insulation of the rotor shaft during operation and abrades the bare vane tips during rub interaction events.

16. The compressor of claim 15 wherein the first metal bond layer is a nickel aluminum alloy, MCrAl, or MCrAlY wherein M is nickel, iron, cobalt, or alloys thereof.

17. The compressor of claim 15 wherein the ceramic layer is zirconia containing 11-14 wt. % yttria.

18. The compressor of claim 15 wherein the abrasive surface on the ceramic layer is produced by crush grinding.

19. The compressor of claim 15 wherein the abrasive surface on the ceramic layer is produced by grit blasting.

* * * * *